US 8,648,837 B1
Feb. 11, 2014

(12) United States Patent
Tran et al.

(10) Patent No.: US 8,648,837 B1
(45) Date of Patent: Feb. 11, 2014

(54) ACTIVE CAPACITIVE CONTROL STYLUS

(75) Inventors: Nghia X. Tran, San Diego, CA (US);
Hoa V. Phan, Escondido, CA (US);
Sunny J. Fugate, Albuquerque, NM
(US); Michael H. Bruch, San Diego,
CA (US)

(73) Assignee: **The United States of America as
represented by the Secretary of the
Navy**, Washington, DC (US)

( * ) Notice: Subject to any disclaimer, the term of this
patent is extended or adjusted under 35
U.S.C. 154(b) by 724 days.

(21) Appl. No.: 12/833,687

(22) Filed: Jul. 9, 2010

(51) Int. Cl.
*G06F 3/033* (2013.01)
(52) U.S. Cl.
USPC ........ 345/179; 345/173; 345/157; 178/19.01;
178/19.03; 178/19.04
(58) Field of Classification Search
USPC ............. 345/175, 179–183; 178/18.01–20.04
See application file for complete search history.

(56) References Cited

U.S. PATENT DOCUMENTS

| | | | | |
|---|---|---|---|---|
| 4,672,154 A * | 6/1987 | Rodgers et al. | ............ | 178/19.07 |
| 5,115,330 A * | 5/1992 | Nobile et al. | .................... | 349/12 |
| 5,488,204 A * | 1/1996 | Mead et al. | ................. | 178/18.06 |
| 5,528,002 A * | 6/1996 | Katabami | ................. | 178/19.06 |
| 6,043,807 A * | 3/2000 | Carroll | ........................... | 345/163 |
| 6,064,374 A * | 5/2000 | Fukuzaki | ....................... | 345/179 |
| 6,188,392 B1 * | 2/2001 | O'Connor et al. | ............ | 345/179 |
| 6,229,102 B1 * | 5/2001 | Sato et al. | .................. | 178/19.01 |
| 6,252,182 B1 * | 6/2001 | Lai | ............... | 178/19.04 |
| 7,202,862 B1 * | 4/2007 | Palay et al. | .................... | 345/179 |
| 7,612,767 B1 * | 11/2009 | Griffin et al. | .................. | 345/179 |
| RE41,521 E * | 8/2010 | Fukushima et al. | ........... | 345/179 |
| 7,791,598 B2 * | 9/2010 | Bathiche | ....................... | 345/179 |
| 7,825,913 B2 * | 11/2010 | Solomon et al. | .............. | 345/179 |
| 2004/0080989 A1 * | 4/2004 | Yu | ................... | 365/200 |
| 2006/0250380 A1 * | 11/2006 | Oliver | ........................... | 345/179 |
| 2008/0165163 A1 * | 7/2008 | Bathiche | ........................ | 345/179 |
| 2009/0262637 A1 | 10/2009 | Badaye et al. | | |
| 2009/0289922 A1 | 11/2009 | Henry | | |
| 2010/0006350 A1 | 1/2010 | Elias | | |
| 2010/0053113 A1 | 3/2010 | Wu et al. | | |
| 2010/0053120 A1 | 3/2010 | Chang et al. | | |
| 2011/0273376 A1 * | 11/2011 | Dickinson et al. | ............ | 345/173 |

\* cited by examiner

*Primary Examiner* — Lun-Yi Lao
*Assistant Examiner* — Gregory J Tryder
(74) *Attorney, Agent, or Firm* — Kyle Eppele; J. Eric Anderson

(57) ABSTRACT

A data transfer device comprising: a body; a tip coupled to the body, wherein the tip has a dielectric constant value suitable for interacting with a capacitive touch screen of a separate device; a control unit mounted to the body; and an electronic switch mounted to the body and operatively coupled to the control unit, wherein the switch is disposed to connect the tip to a ground source when the switch is in a closed configuration and to break the connection between the tip and the ground source when the switch is in an open configuration.

2 Claims, 15 Drawing Sheets

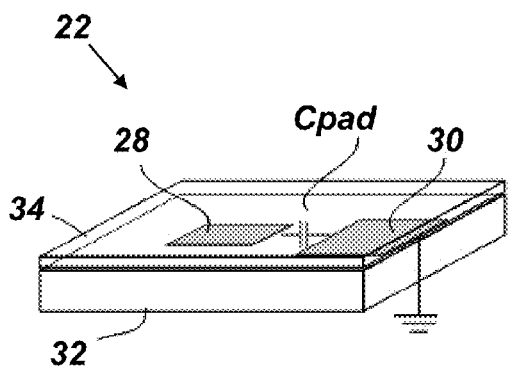
Fig. 3a
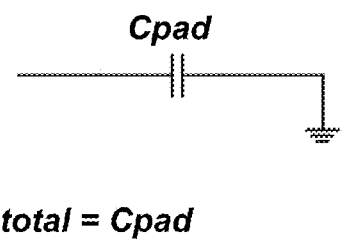
$Ctotal = Cpad$
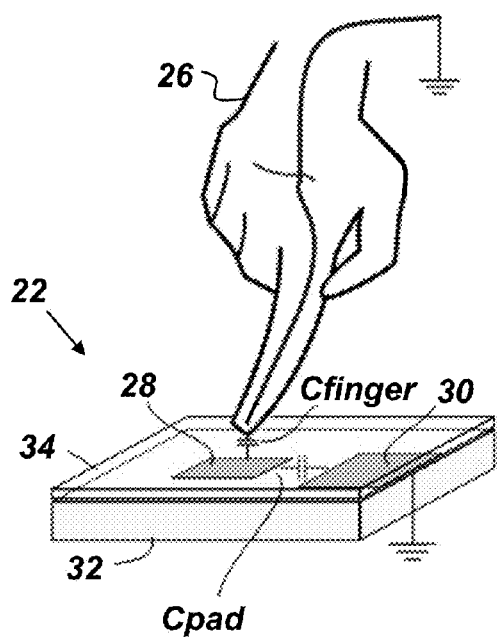
Fig. 3b
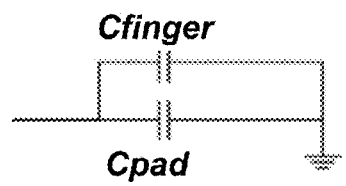
$Ctotal = Cpad + Cfinger$

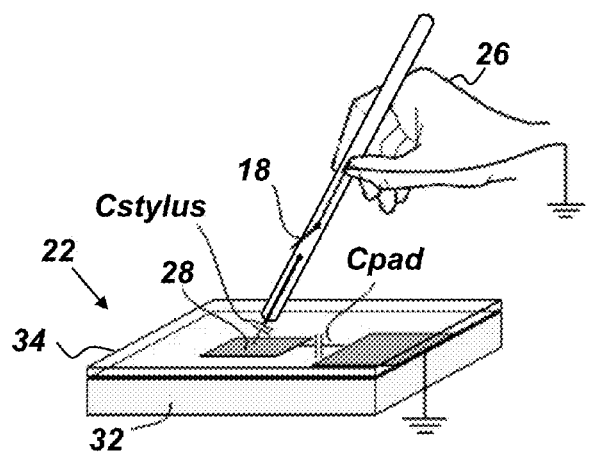 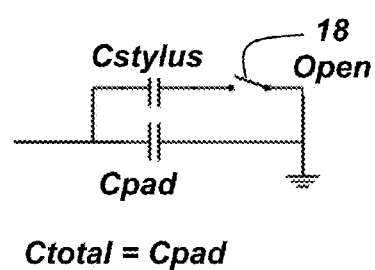
Fig. 4a
$Ctotal = Cpad$
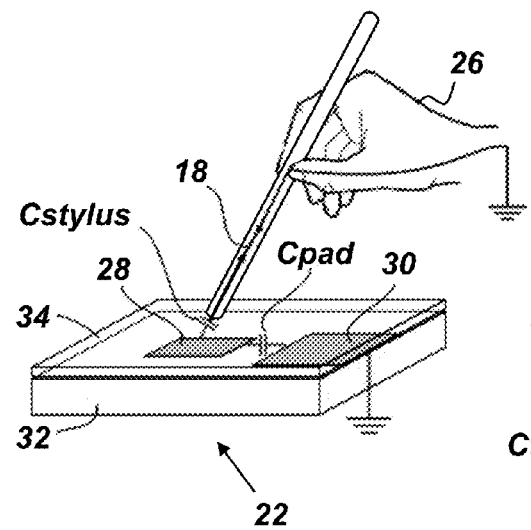 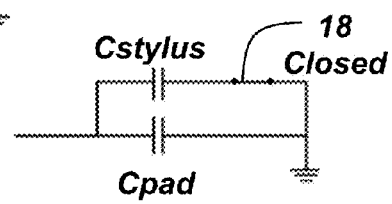
Fig. 4b
$Ctotal = Cpad + Cstylus$ Value of total capacitance at T0, T2, T4, and T6 is *Ctotal = Cpad*
Value of total capacitance at T1, T3, and T5 is *Ctotal = Cpad + Cstylus*

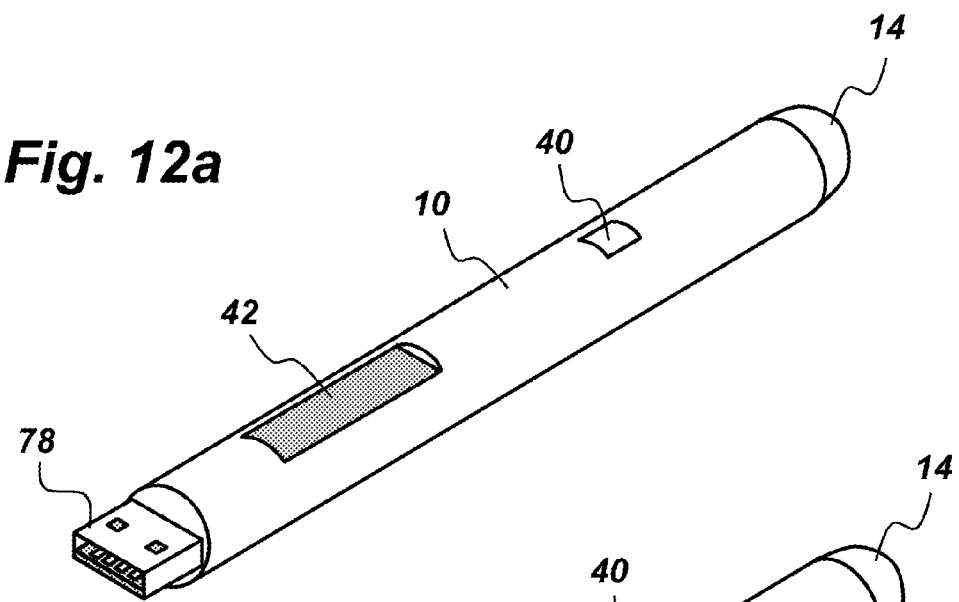
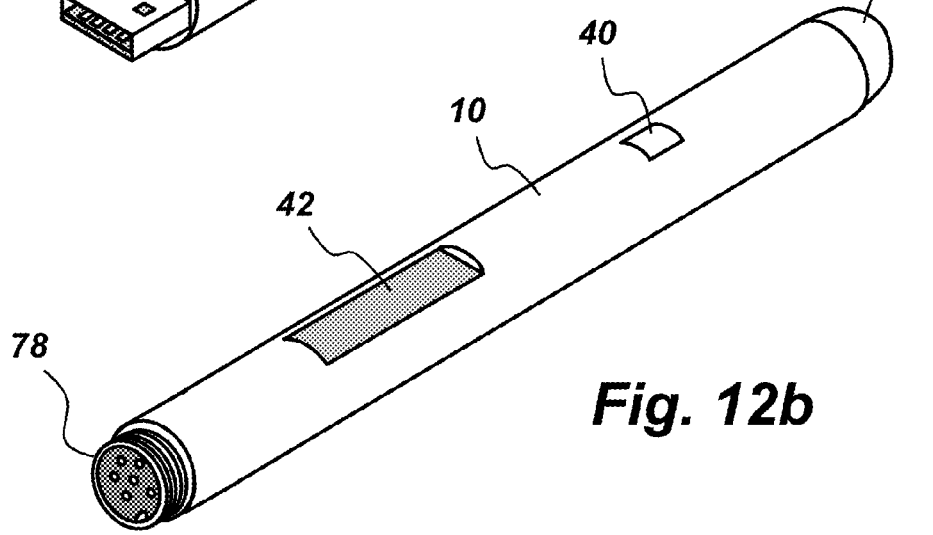

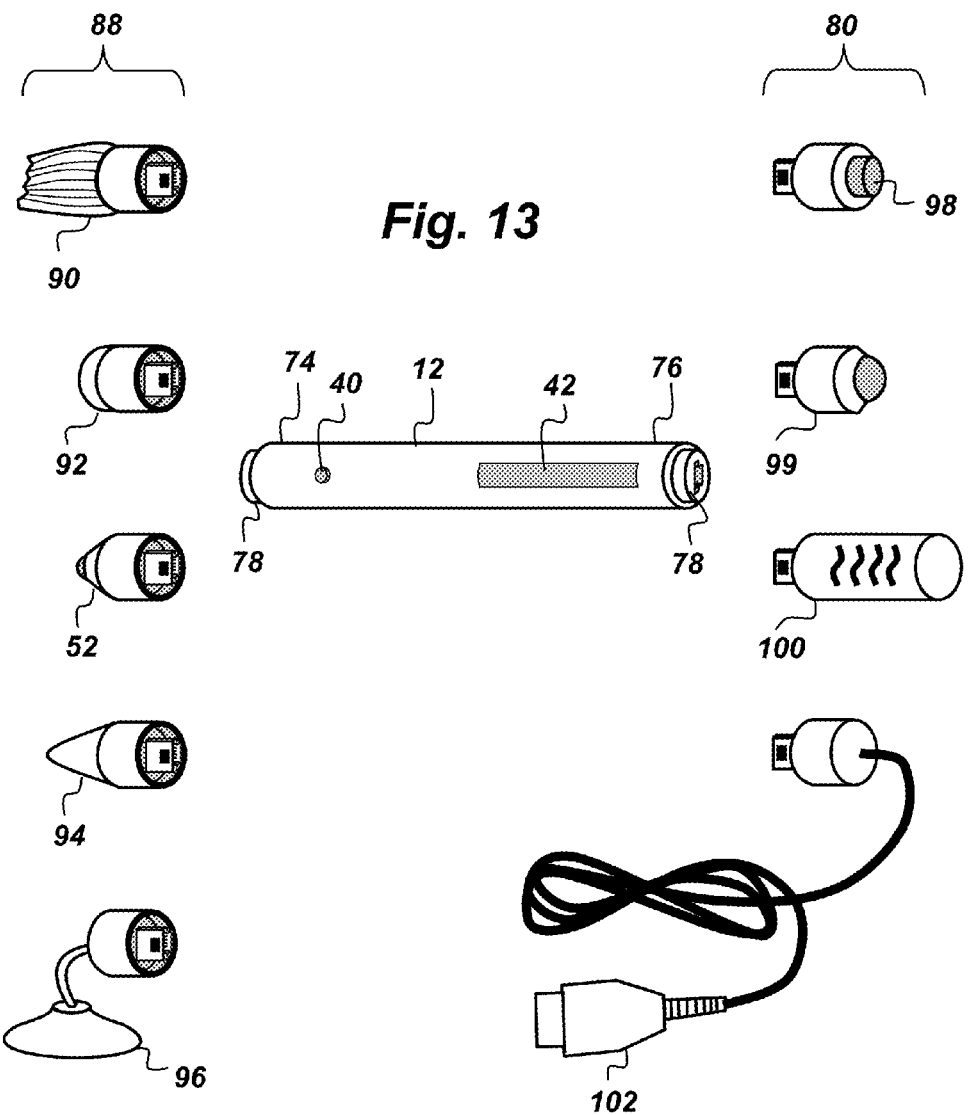

ACTIVE CAPACITIVE CONTROL STYLUS

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil. Reference Navy Case Number 100270.

BACKGROUND OF THE INVENTION

This invention relates generally to devices for transferring data through a capacitive touch screen. In recent years capacitive sensing technology has been integrated and employed in many electronic applications and devices. The capacitive sensor is replacing conventional mechanical switches and buttons used to input data and control operating machines, computer systems, games, and electronic portable devices. Touch screens on phones and other handheld devices are exemplary in their use of capacitive sensing technology. Using finger touches on the sensor screen to input data is very convenient; however as currently implemented a user can only input one value at a time with a touch. Such input is limited to the speeds at which a human can reasonably input via screen touches. To input a series of values such as a phone number or address, a user must perform several touches on different screen regions to input the information. On-screen keyboards are commonly implemented as a general-purpose input mechanism. However, current methods of transferring data through a capacitive touch screen are limited by their reliance on visual feedback and sequential input.

SUMMARY

Disclosed herein is a data transfer device comprising: a body; a tip coupled to the body, wherein the tip has a dielectric constant value suitable for interacting with a capacitive touch screen of a separate device; a control unit mounted to the body; and an electronic switch mounted to the body and operatively coupled to the control unit, wherein the switch is disposed to connect the tip to a ground source when the switch is in a closed configuration and to break the connection between the tip and the ground source when the switch is in an open configuration.

Also disclosed is a method for transferring data to a capacitive touch screen comprising the following steps: bringing a tip having a dielectric constant value suitable for interacting with the capacitive touch screen into contact with the capacitive touch screen, wherein the tip is isolated from a ground source, but for an electronic switch; and rapidly switching the electronic switch with a microcontroller such that serial data is transferred into the capacitive touch screen.

Another embodiment of the data transfer device comprises: a body; a control unit mounted within the body; a tip operatively coupled to the control unit, wherein the tip has a dielectric constant value substantially similar to that of a human finger; an input button mounted to the body and operatively coupled to the control unit; a display mounted to the body and operatively coupled to the control unit; and an electronic switch mounted to the body and operatively coupled to the control unit, wherein the switch is disposed to connect the tip to a ground source when the switch is in a closed configuration and to break the connection between the tip and the ground source when the switch is in an open configuration.

BRIEF DESCRIPTION OF THE DRAWINGS

Throughout the several views, like elements are referenced using like references. The elements in the figures are not drawn to scale and some dimensions are exaggerated for clarity.

FIGS. 3a-3b are illustrations showing the operation of a typical capacitive touch screen.

FIGS. 4a-4b show the operation a capacitive touch screen 22 with a data transfer device.

FIGS. 12a-12b are illustrations of different embodiments of a mechanical and electrical interface on a data transfer device.

FIG. 13 is an illustration of a data transfer device having a plurality of interchangeable tips and accessory devices.

DETAILED DESCRIPTION OF EMBODIMENTS

Figure 1:
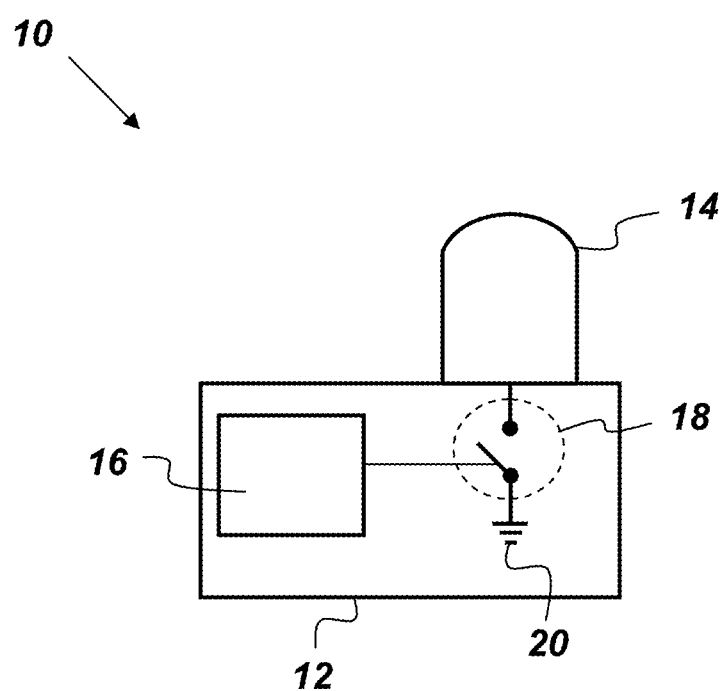
FIG. 1 is an illustration of a data transfer device.

FIG. 1 is an illustration of a data transfer device 10. As shown in FIG. 1, the data transfer device 10 comprises a body 12, a tip 14, a control unit 16, and an electronic switch 18. The tip 14, which is coupled to the body 12, has a dielectric constant value that is suitable for interacting with a capacitive touch screen of a separate device such as the one shown in FIGS. 2a-2b. The control unit 16 and the electronic switch 18 are both mounted to the body 12. The switch 18 is operatively coupled to the control unit 16 such that the control unit 16 controls the opening and closing of the switch 18. The switch 18 is disposed to connect the tip 14 to a ground source 20 when the switch 18 is in a closed configuration and to break the connection between the tip 14 and the ground source 20 when the switch 18 is in an open configuration. In other words, the tip 14 is electrically isolated from the ground source 20, but for the switch 18. The data transfer device 10 may be used to transfer data to a capacitive touch screen by bringing the tip 14 into contact with the capacitive touch screen and rapidly switching the electronic switch with a microcontroller such that serial data is transferred into the capacitive touch screen.

The body 12 may be any size or shape capable of supporting the tip 14, the electronic switch 18 and the control unit 16. For example, the body 12 may be, but is not limited to, a cylindrical housing such as the one shown in FIGS. 2a-2b, a glove such as that shown in FIG. 14, or a rectangular prism, such as the one shown in FIG. 15. The body 12 may be conductive or non-conductive. For example, in one embodiment, the body 12 may be in the shape of a hand-held stylus and made out of conductive material such that a user's hand 26 is the ground source 20.

The tip 14 may be of any size, shape, or material that is capable of interacting with a capacitive touch screen. For example, the tip 14 may be made of an elastic material which has dielectric characteristics about the same as a human finger and provides a soft touch on the capacitive touch screen. In another embodiment, the tip 14 may be metallic. Other examples of the tip 14 shape include, but are not limited to: a paintbrush tip, a marker tip, a ball-point pen tip, a pointed tip, and a rounded tip. Some of these shapes are depicted in FIG. 13. Those having ordinary skill in the art will realize that there are many possible sizes and shapes for the tip 14 that would be compatible with a capacitive touch screen.

The electronic switch 18 may be any switch capable of being rapidly controlled by the control unit 16. Suitable examples of the electronic switch 18 include, but are not limited to, an electro-mechanical switch, a solid-state switch, and a micro-electro-mechanical system (MEMS) switch.

Figure 2:
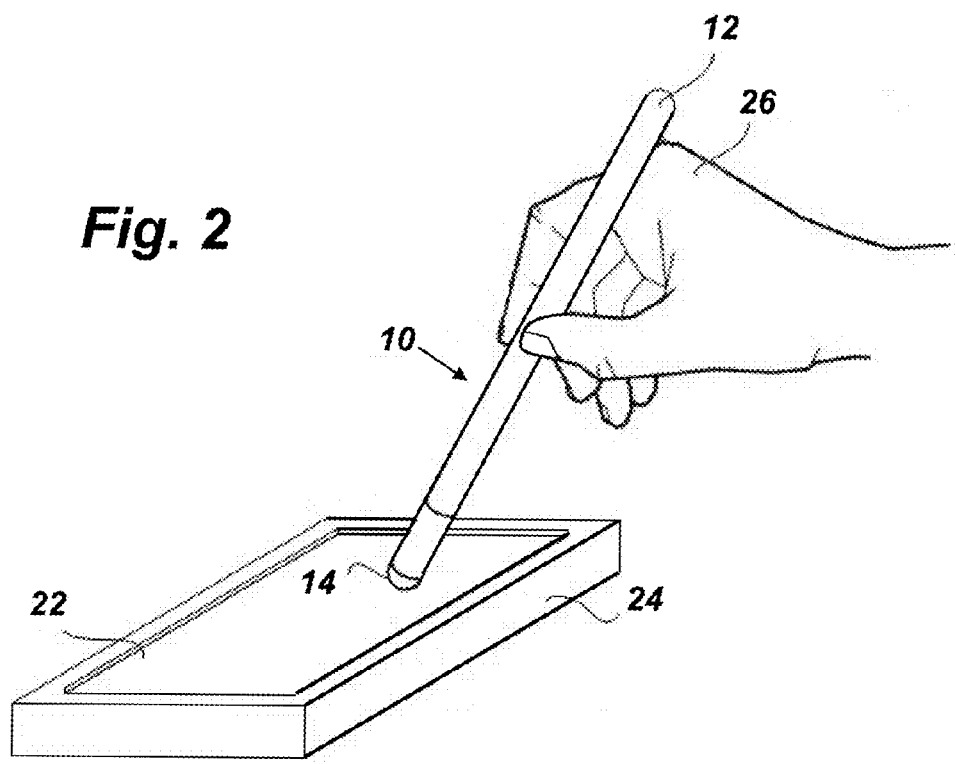
FIG. 2 is a perspective view of a data transfer device engaging a capacitive touch screen.

FIG. 2 shows a perspective view of one embodiment of the data transfer device 10 transferring data through a capacitive touch screen 22 of a separate device 24. The separate device may be any machine with a capacitive touch screen 22 such as, for example, a cellular phone, a computer, a personal digital assistant, or a machine operator control panel. In this embodiment, the body 12 is shaped such that a user may hold the data transfer device 10 in his/her hand 26.

FIGS. 3a-3b show the operational principle behind a typical capacitive touch screen 22. A typical capacitive touch screen 22 comprises at least one capacitive sensor element 28 and a ground plane 30, both of which are typically capacitive pads laid out on a substrate 32. The capacitive sensor elements 28 and the ground plane 30 are usually covered by a protective layer 34. As shown in FIG. 3a, the two capacitive pads form a capacitor, denoted as Cpad. The circuits on the right of FIGS. 3a-3b are electrical representations of the layouts to the circuits' left. In FIG. 3b, the finger-touch on the protective layer 34 forms a gap between the finger-tip and the capacitive sensor element 28, which forms another capacitor named Cfinger. The ground plane 30 of a capacitive touch screen 22 is often connected to Ground via a user's hand(s) 26 and body. As shown in FIG. 3a, when there is no finger touch, the total capacitance Ctotal=Cpad. As shown in FIG. 3b, when there is finger touch, the total capacitance Ctotal=Cpad+Cfinger. An additional electronic circuit can measure the difference in capacitance in the two situations, though only about 10 to 100 pF, and interpret it as two different signal levels such as ON/OFF.

FIGS. 4a-4b describe the operation of one embodiment of the data transfer device 10. As shown in FIG. 4a, the finger(s) or hand 26 of the user is not directly in contact with the protective layer 34, but via the electronic switch 18. In this embodiment, the body 12 is conductive. When a user's finger(s) touch the body 12, the body 12 connects to one side of the electronic switch 18. The other side of the electronic switch 18 is connected to the tip 14, which is also conductive. The tip 14 and the capacitive sensor element 28 form a capacitance named Cstylus. As shown in FIG. 4a, when the switch 18 is opened, the total capacitance Ctotal=Cpad. When the switch 18 is closed, as shown in FIG. 4b, the total capacitance Ctotal=Cpad+Cstylus.

Figure 5A:
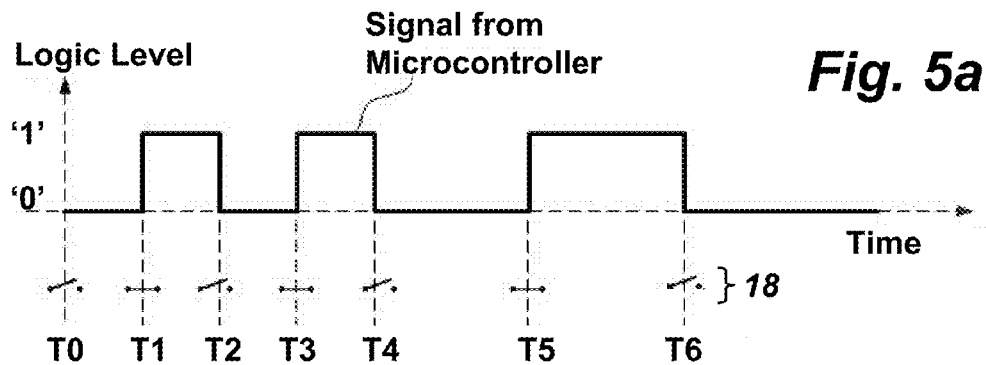
FIG. 5a is a plot of an electrical signal generated by a control unit of a data transfer control device.

FIG. 5a is a plot of an example electrical signal generated by the data transfer device 10 as the control unit 16 controls the switch 18. Logic level '0' and '1' represent two signal voltage levels that the control unit 16 may generate. Signal '0' drives the switch 18 to open and signal '1' drives the switch 18 to close. This logic may be reversed for some applications in order to save power and to simplify protocol design. When the switch 18 is open, the total capacitance Ctotal=Cpad. When the switch 18 is closed the total capacitance Ctotal=Cpad+Cstylus. From the different values of capacitance, the capacitive touch screen 22 can measure the difference, which the device 24 can interpret as serial data input.

Figure 5B:
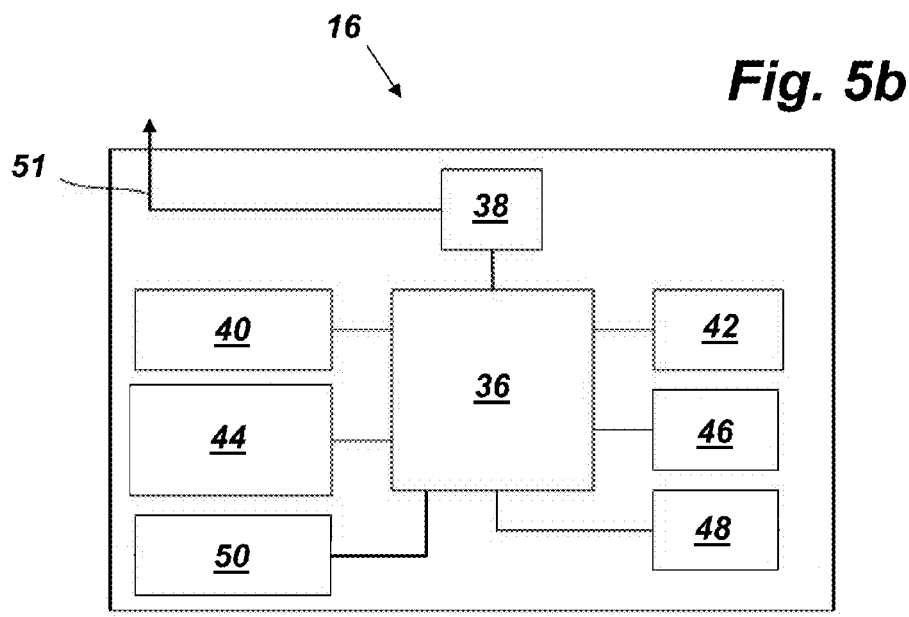
FIG. 5b is a block diagram of an embodiment of a control unit.

FIG. 5b is a block diagram of an example embodiment of the control unit 16. The control unit 16 comprises a microcontroller 36 and a switch driver 38. The microcontroller 36 generates and sends On/Off electrical signals to control the switch driver 38 to close and open the electronic switch 18 in a desired temporal pattern. A user can input data or select data to send through the tip 14 to the separate device 24 via an input button 40. The data transferred from the tip 14 into the capacitive touch screen 22 of the separate device 24 may comprise instructions to the separate device 24. When such a device 24 controls a graphical display such as a liquid crystal display (LCD), portions of displayed content may be manipulated according to the received instructions when the tip 14 passes over the capacitive touch screen 22. It is understood by one having ordinary skill in the art that the device 24 may comprise a display screen and a capacitive touch screen which co-reference one another.

The input button 40 may also be used to allow the user to select the operating mode of the data transfer device 10 and may also be used to select a data base stored in the control unit 16. In a stylus mode of operation the control unit 16 is disposed to maintain the electronic switch 18 in the closed configuration. Alternatively, in a data transfer mode the control unit 16 is disposed to transfer data to the separate device 24 by rapid actuation of the electronic switch 18 while the tip 14 remains in contact with the capacitive touch screen 22. In yet another embodiment, the control unit 16 may be configured to transfer data to the separate device 24 both by rapid actuation of the electronic switch 18 as well as the movement of the tip 14 over the protective layer 34 of the capacitive touch screen 22. For example, if a user desired to draw a line on a capacitive touch screen, the data transfer device 10 is capable of simultaneously transferring multiple characteristics of the desired line to the separate device 24. For example, the location of the tip 14 on the capacitive touch screen 22 could determine the location of the line, the speed of movement of the tip 14 over the capacitive touch screen 22 could determine the opacity of the line, acceleration of the tip 14 could determine whether the drawn line endpoints are rough or smooth in displayed texture, and the serial data transferred through the tip by rapid actuation of the switch 18 could determine other line characteristics such as, but not limited to, the color, hue, saturation, and line-type. In a copy mode, the tip 14 could be dragged across text to inform the device 24 that a user desires to highlight or copy the text. The serially-transferred data could provide instructions to the separate device 24 to both visually highlight and copy the highlighted text—all in one stroke.

The control unit 16 may also comprise a display 42, which provides the user with a view of the operational status of the data transfer device 10 and representations of data before, during, and/or after the data is sent to the switch driver 38. In connection with the line-drawing example provided above, the display 42 may be used to display the current color of the stroke and the input button 40 may be configured to allow the user to select the color and width of the stroke from a menu. The control unit 16 may comprise a memory store comprising a data base of text, numbers, figures, pictures, templates, maps, etc. for a user to choose from.

Figure 7:
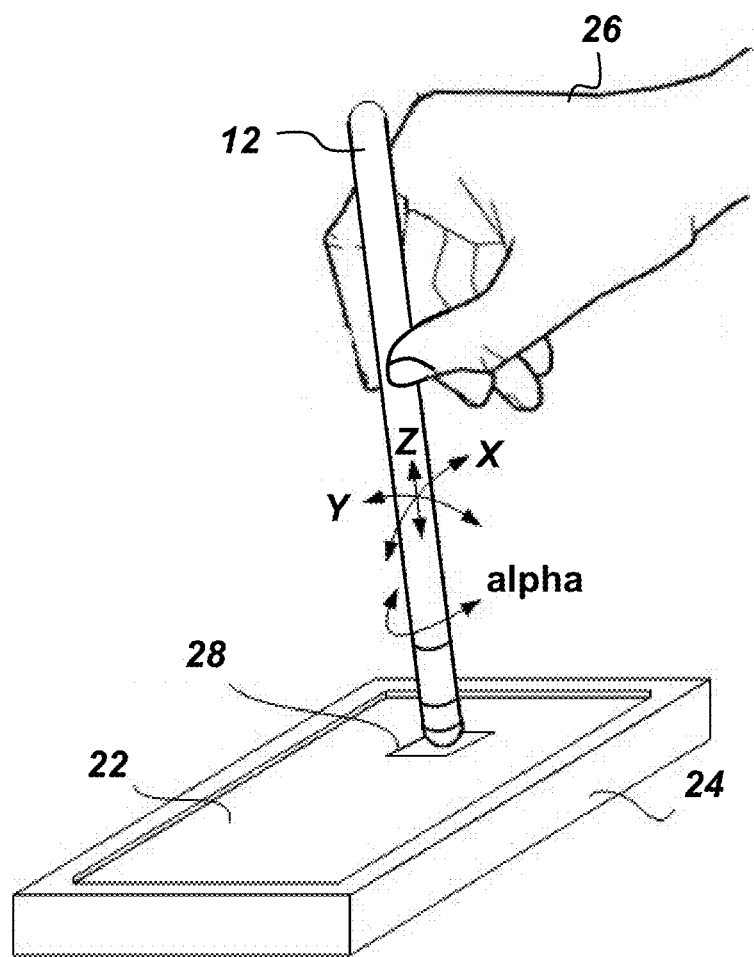
FIG. 7 is a perspective view of a data transfer device showing range of motion.

The control unit 16 may further comprise motion and orientation sensors 44, which measure motion and orientation of the data transfer device 10. The control unit 16 may be configured to interpret the output from the motion and orientation sensors 44 as control commands such as up, down, turn, in, and out, which can subsequently be transferred to the separate device 24. In this manner, the data transfer device 10 could be used as a multiple-axis joystick, as shown in FIG. 7. Suitable examples of the motion and orientation sensors 44 include, but are not limited to: 3-dimensional magnetic sensors, 3-dimensional acceleration sensors, and 3-dimensional gyroscopes.

The control unit 16 may also comprise a haptic feedback module 46, which provides tactile feedback to the finger and hand of the user—indicating operation control status. The control unit 16 may also be equipped with a transceiver 48, which may provide an interface between multiple data transfer devices 10 or between a data transfer device 10 and a personal computer for the update of internal memory data and the transfer of data. The transceiver 48 can be wired or wireless. The control unit 16 may also comprise a power unit 50 that supplies power for all the electronic components of the data transfer device 10. In one embodiment, the power unit 50 comprises a charger, a battery and a regulator. As an alternative to the embodiment discussed above where the user's hand acts as the ground source 20, the power unit 50 may provide the ground source 20. Also shown in FIG. 5b is a switch control signal 51, which is sent from the switch driver 38 to the electronic switch 18.

Figure 6A:
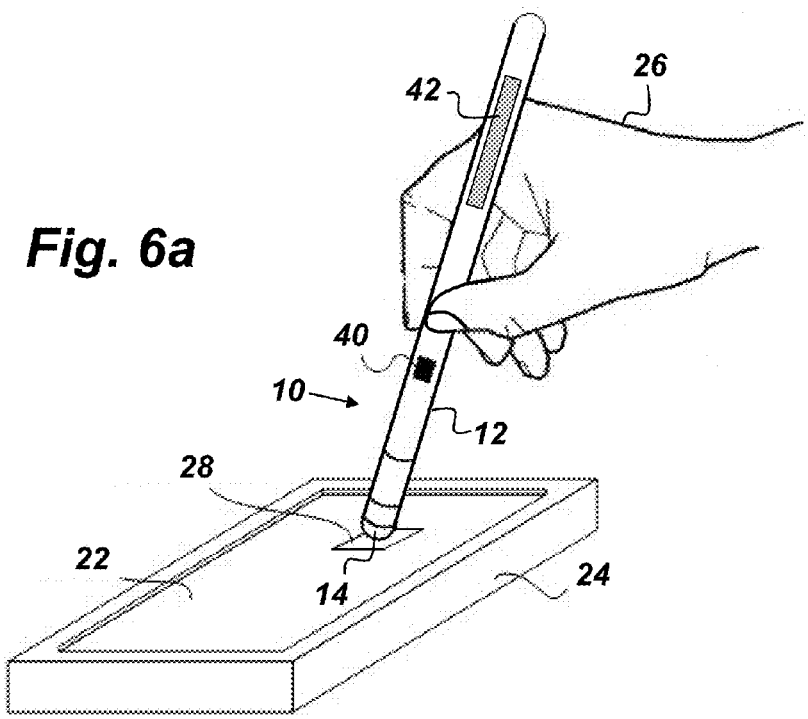
FIGS. 6a-6b are illustrations of another embodiment of a data transfer device.
Figure 6B:
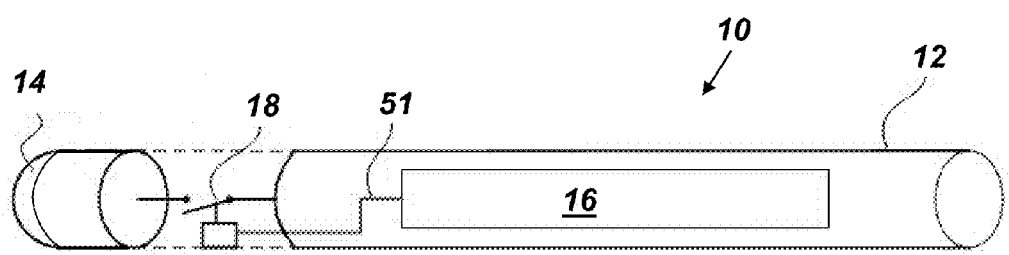

FIG. 6a is a perspective view of another embodiment of the data transfer device 10 showing the display 42 and the input button 40 mounted on the body 12. A user may use the input button 40 and display 42 to select data from a list, shown on the display 42, which would then be transferred through the tip 14 while the tip 14 rests on the capacitive touch screen 22. The data will then be retrieved and interpreted by the capacitive sensor element 28. FIG. 6b is an internal view of the data transfer device 10 depicted in FIG. 6a depicting the electronic switch 18 and the control unit 16 mounted within the body 12.

FIG. 7 is a perspective view of an embodiment of the data transfer device 10 showing the range motion of the data transfer device 10. While holding the tip 14 on the capacitive touch screen 22, a user can change the orientation of the body 12 in the following directions: X, Y, Z, and angle alpha. The control unit 16 is configure to receive the outputs from the orientation and motion sensors 44 and to convert that orientation information into control commands for controlling items or actions on the separate device 24. The orientation sensors 44 are disposed to generate acceleration data representing accelerations of the data transfer device 10 in X, Y, Z directions as well as rotation of the data transfer device 10 about a center axis A-A of the data transfer device 10. A motion gesture can be performed in air or on the other surfaces with the data transfer device 10, and the control unit 16 captures the gesture. The gesture is then transferred to the capacitive touch screen 22.

Figure 8:
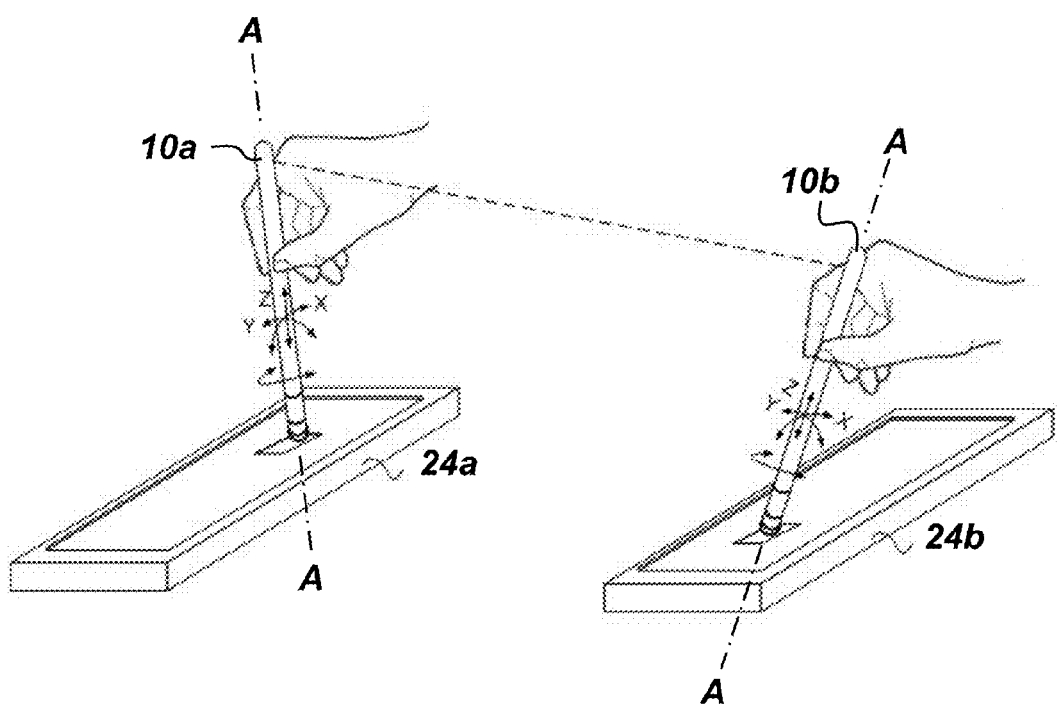
FIG. 8 is a perspective view of two linked data transfer devices.

FIG. 8 is an illustration showing two wirelessly linked data transfer devices 10a and 10b. The transceiver 48 in each data transfer device 10 allows the data transfer devices 10a and 10b to communicate with each other at a distance. Although the data transfer devices 10a and 10b are shown in FIG. 8 to be wirelessly connected, it is to be understood that a wireless link is merely one embodiment and that the link between different data transfer devices 10 may be wired or wireless. Users of separate data transfer devices 10a and 10b may desire to link their data transfer devices in order to share information or synchronize control and actions on different separate devices 24a and 24b or other equipment.

Figure 9A:
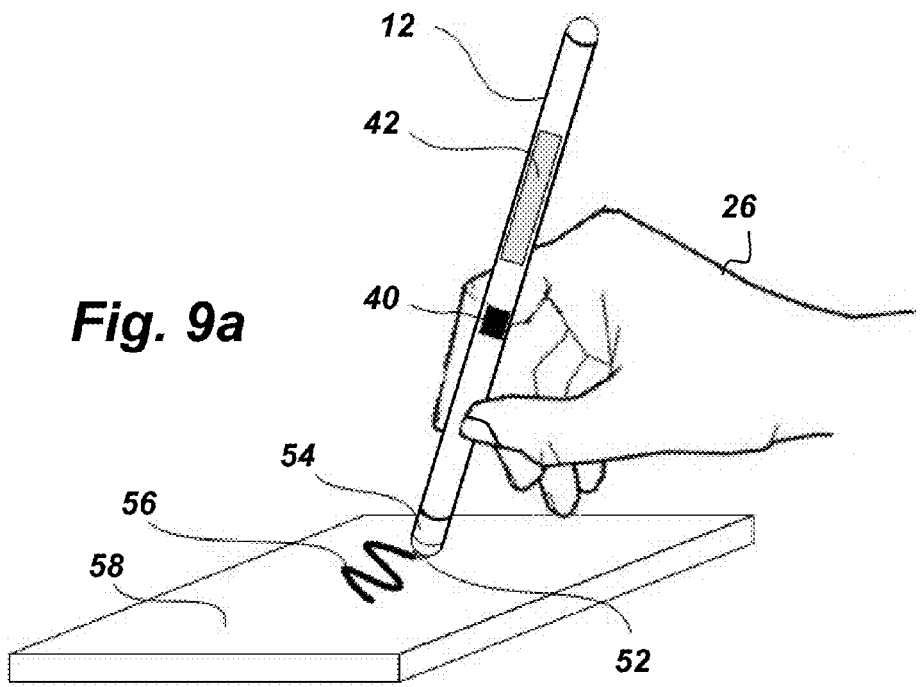
FIGS. 9a-9b are illustrations of another embodiment of a data transfer device.
Figure 9B:
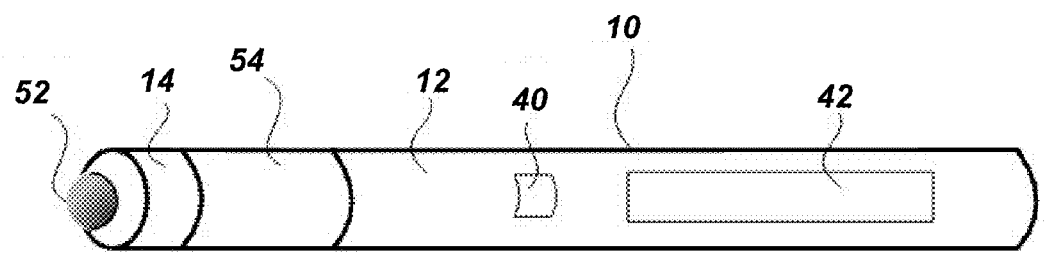

FIGS. 9a-9b are illustrations of another embodiment of the data transfer device 10 wherein the tip 14 includes a trackball sensor 52. In this embodiment, the tip 14 is mounted on a detachable head 54. The data transfer device 10 with an integrated trackball sensor 52 on its tip 14 is capable of tracking and recording hand-writing 56 on a surface 58 as well as sending the recorded data to the separate device 24 through the capacitive touch screen 22 as discussed above. The control unit 16 may be configured to analyze and recognize alphanumeric and symbolic characters from the data generated by the trackball sensor 52.

Figure 10A:
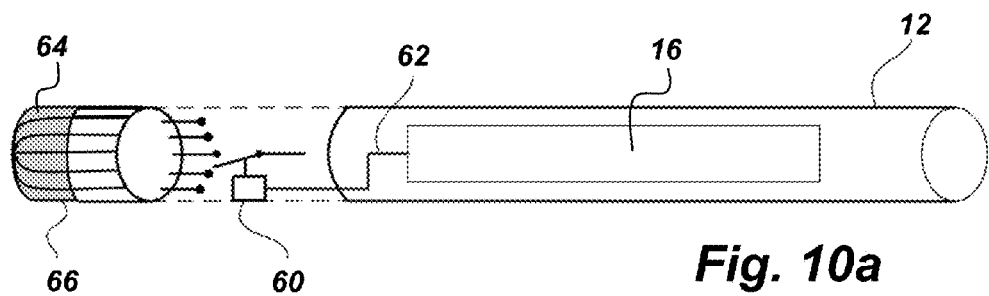
FIGS. 10a-10c are illustrations of other embodiments of a data transfer device.
Figure 10B:
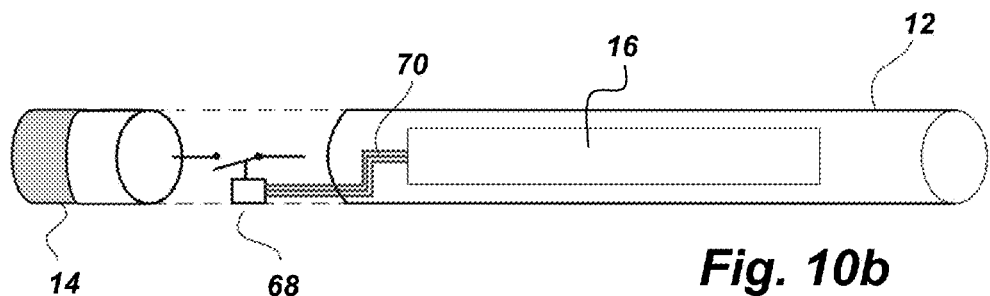
Figure 10C:
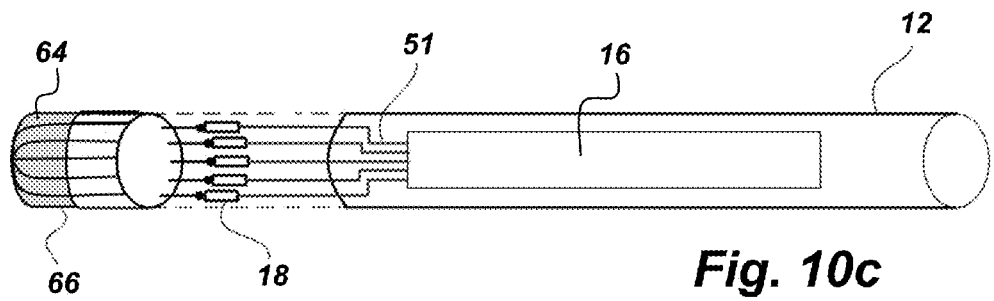

FIG. 10a shows a data transfer device 10 configured with a demultiplexing electronic switch 60 to switch data from a serial bus switch control signal 62 generated by the control unit 16 across individual electrically isolated segments 64 of a segmented tip 66. The segmented tip in this embodiment could be used to detect finger grasping position or as a control surface for active manipulation of the switched data streams. Note that the segmented tip 66 can be segmented such that each segment 64 is electrically isolated and that each segment 64 is equal in area. The segmented tip 66 could be made flexible such that pressure would cause a greater number of segments 64 to contact the surface of the capacitive touch screen 22, allowing pressure applied by the user to be used as a control parameter. FIG. 10b shows an alternate embodiment of the data transfer device 10 configured with a multiplexing electronic switch 68 to switch data from a parallel bus switch control signal 70 generated by the control unit 16 across a non-segmented tip 14. FIG. 10c shows another embodiment of the data transfer device 10 where the control unit 16 is configured to generate multiple switch control signals 51, each of which activates a different segment 64 of the segmented tip 66.

Figure 11A:
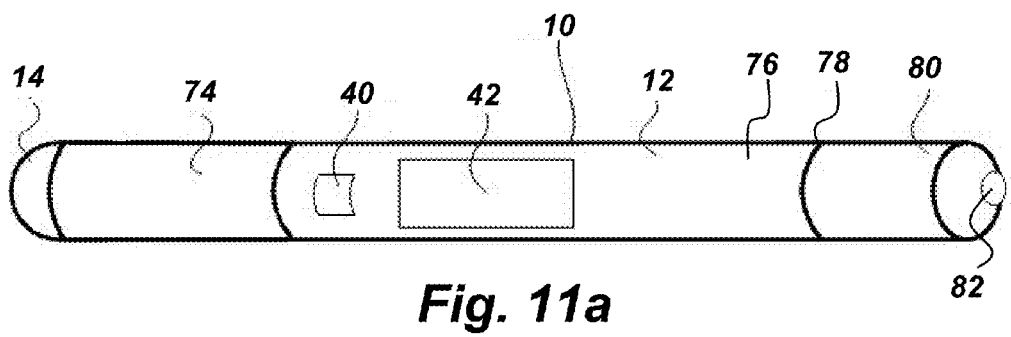
FIGS. 11a-11b are illustrations of another embodiment of a data transfer device.
Figure 11B:
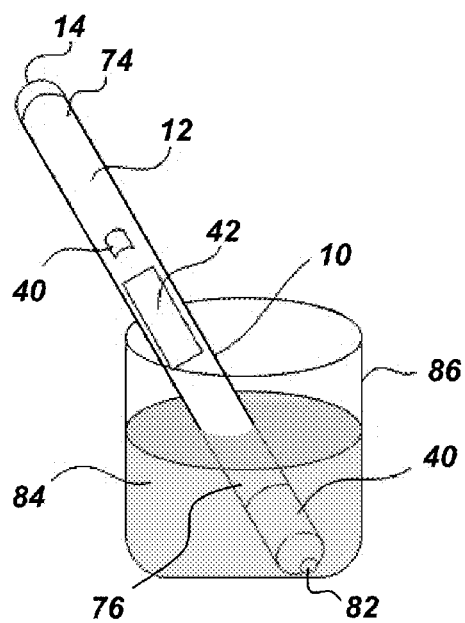

FIGS. 11a-11b illustrate another embodiment of the data transfer device 10. In this embodiment, the body 12 comprises first and second ends 74 and 76 respectively. The tip 14 is coupled to the first end 74 and the second end 76 comprises an electronic and mechanical interface 78 disposed to engage an accessory device 80. The electronic and mechanical interface 78 is disposed to electrically couple the accessory device 80 to the control unit 16 and to mechanically couple the accessory device 80 to the second end 76 of the body 12. The accessory device 80 shown in FIGS. 11a-11b is a chemical and temperature sensor 82. The chemical and temperature sensor 82 is configured to sample, monitor, and capture temperature and chemical characteristics of a chemical solution 84 held in the container 86. The control unit 16 can record and store output data from the chemical and temperature sensor 82. The stored output data can be later transferred to the separate device 24 for further processing and analyzing. The chemical and temperature sensor 82 may also operate in an open-air sensing environment in which environmental contaminants or environmental characteristics are tracked. The data transfer device 10 can be used as a probe to interrogate a surface, container, or region by placing the data transfer device 10 directly upon a surface or by attaching the data transfer device 10 to an extended shaft to reach a surface or region.

While the accessory device 80 is portrayed in FIGS. 11a-11b as a chemical and temperature sensor 82, it is to be understood that the accessory device 80 is not limited to a chemical and temperature sensor, but may be any device that is compatible with, and adds functionality to the data transfer device 10. Suitable examples of the accessory device 80 include, but are not limited to, an environmental characteristic sensor, a connection adapter, an auxiliary power supply, a track ball, a writing implement tip, a wireless data transfer unit, a laser pointer, a microphone, a camera, a radio receiver, an infrared transmitter, a vitals sign sensor, and a light source.

FIGS. 12a-12b illustrate different embodiments of the electronic and mechanical interface 78. The electrical and mechanical interface 78 may be any interface capable of holding an accessory device 80 and electrically connecting the accessory device to the control unit 16. FIG. 12a shows the electrical and mechanical interface 78 as a universal serial port (USB) plug. FIG. 12b shows the electrical and mechanical interface 78 as a multi-pin connector. One having ordinary skill in the art will recognize that there are many suitable embodiments of the electrical and mechanical interface 78 beyond those specifically mentioned above.

FIG. 13 shows another embodiment of the data transfer device 10 where the body 12 comprises electrical and mechanical interfaces 78 on both the first and second ends 74 and 76. The interface 78 on the first end 74 is disposed to mechanically and electrically interface with each of a plurality of interchangeable tips 88. The interface 78 on the second end 76 is disposed to mechanically and electrically interface with one of a plurality of accessory devices 80. In operation, the data transfer device 10 may comprise any desired combination of interchangeable tips 88 and accessory devices 80.

The interchangeable tip 88 may be any size, shape, and material that allow the interchangeable tip 88 to be capable of interacting with the capacitive touch screen 22. For example, in one embodiment, the interchangeable tip 88 may comprise bristles 90 substantially similar to that of a paint brush. In another embodiment, the interchangeable tip 88 may be a blunt tip 92 made of an elastic material which has dielectric characteristics about the same as a human finger and provides a soft touch on the capacitive touch screen 22. In another embodiment, the interchangeable tip 88 may be a stylus tip 94 having a sharper tip than the blunt tip 92. In another embodiment, the interchangeable tip 88 may comprise a trackball sensor 52. Also shown in FIG. 13, is another embodiment of the interchangeable tip 88 comprising a suction cup 96 disposed to be coupled to the capacitive touch screen 22 and disposed to be electrically coupled to the electronic switch 18 (not shown) via the electrical and mechanical interface 78. The suction cup 96 allows greater freedom of movement of the data transfer device 10 while still enabling serial data transfer through the capacitive touch screen.

FIG. 13 illustrates four example embodiments of the accessory device 80. In one embodiment, the accessory device 80 comprises at least one button 98. The accessory device 80 may be a finger trackball 99, an environmental characteristic sensor 100, and/or a connection adapter 102. The environmental characteristic sensor 100 may be any sensor disposed to sense a characteristic of the environment surrounding the data transfer device 10 such as the temperature, humidity, gas and/or chemical presence, audio levels and frequencies, light level, etc. The connection adapter 102 may be any desired electrical adapter for allowing the data transfer device 10 to interface with another machine.

Figure 14:
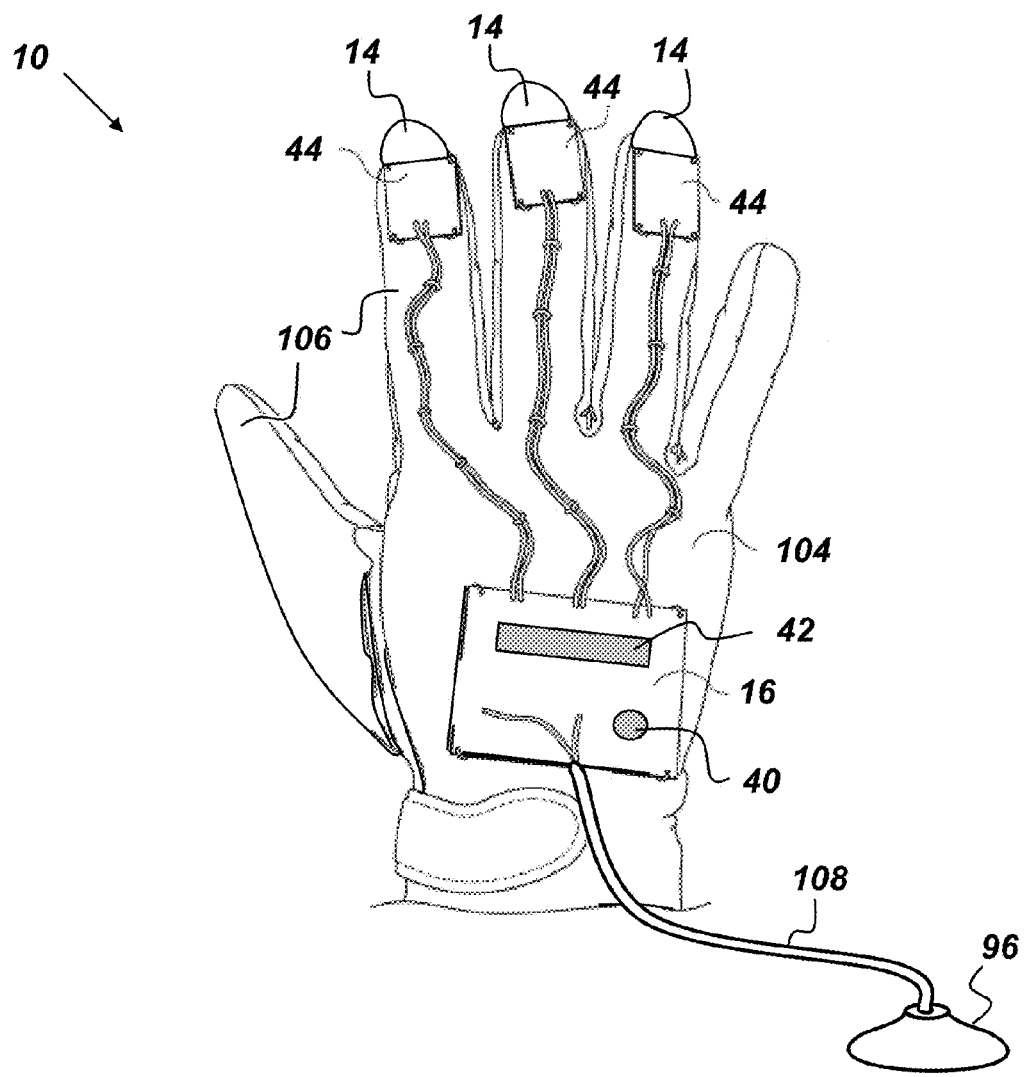
FIG. 14 is an illustration of another embodiment of a data transfer device.

FIG. 14 shows another embodiment of the data transfer device 10 where the body 12 is in the form of a glove 104. In this embodiment, a tip 14 may be placed at the end of one or more of the glove's fingers 106. Alternatively, the glove 104 may be coupled to a suction cup tip 96 via a conductive tether 108—this allows the glove 104 to utilize a large number of degrees of freedom while maintaining contact with the separate device 24. In this embodiment, gesture data provided by the motion and orientation sensors 44 could be transferred into the capacitive touch screen 22.

Figure 15:
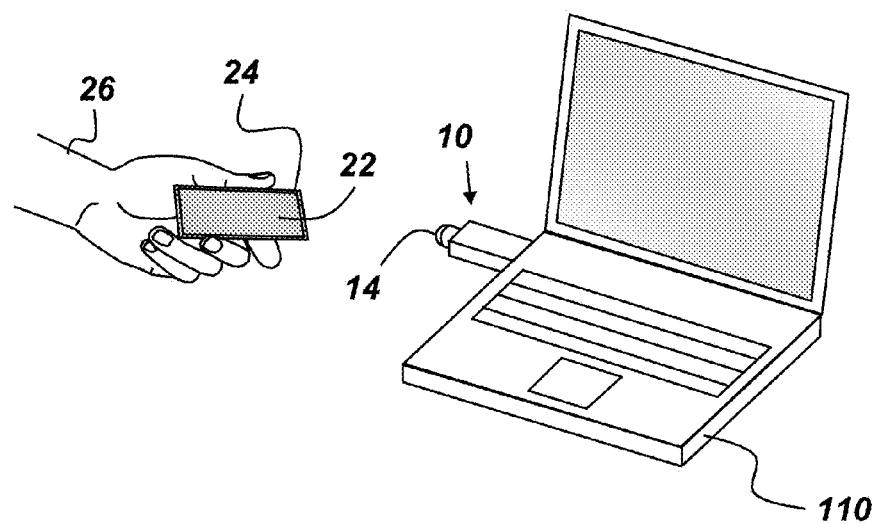
FIG. 15 is an illustration of another embodiment of a data transfer device.

FIG. 15 shows another embodiment of the data transfer device 10 as an interface between a separate device 24 with a capacitive touch screen 22 and a machine 110. Although the machine 110 is shown in FIG. 15 to be a laptop computer, it is to be understood that the machine 110 may be any machine with a digital central processing unit. In the embodiment shown in FIG. 15, the data transfer device 10 is plugged into a USB port of a laptop with the tip 14 directed outwards ready to engage the capacitive touch screen 22 of the separate device 24.

From the above description of the data transfer device 10, it is manifest that various techniques may be used for implementing the concepts of data transfer device 10 without departing from its scope. The described embodiments are to be considered in all respects as illustrative and not restrictive. It should also be understood that the data transfer device 10 is not limited to the particular embodiments described herein, but is capable of many embodiments without departing from the scope of the claims.

We claim:

1. A data transfer device comprising:
a body;
a control unit mounted within the body;
a tip operatively coupled to the control unit, wherein the tip has a dielectric constant value substantially similar to that of a human finger, and wherein the tip is segmented into electrically isolated regions of substantially similar area, wherein each segment is operatively coupled to the control unit via a demultiplexing electronic switch, and wherein the tip is flexible such that a greater number of the segments may be brought into contact with the capacitive touch screen by applying pressure to the tip;
an input button mounted to the body and operatively coupled to the control unit;
a display mounted to the body and operatively coupled to the control unit; and
an electronic switch mounted to the body and operatively coupled to the control unit, wherein the switch is disposed to connect the tip to a ground source when the switch is in a closed configuration and to break the connection between the tip and the ground source when the switch is in an open configuration.

2. The data transfer device of claim 1, further comprising a wireless data transfer unit operatively coupled to the control unit such that the data transfer device is configured to communicate with other electronic devices.

\* \* \* \* \*